D. E. PATTON.
PUNCTURE PROOF TIRE.
APPLICATION FILED JAN. 26, 1921.
1,409,021.  Patented Mar. 7, 1922.
2 SHEETS—SHEET 1.
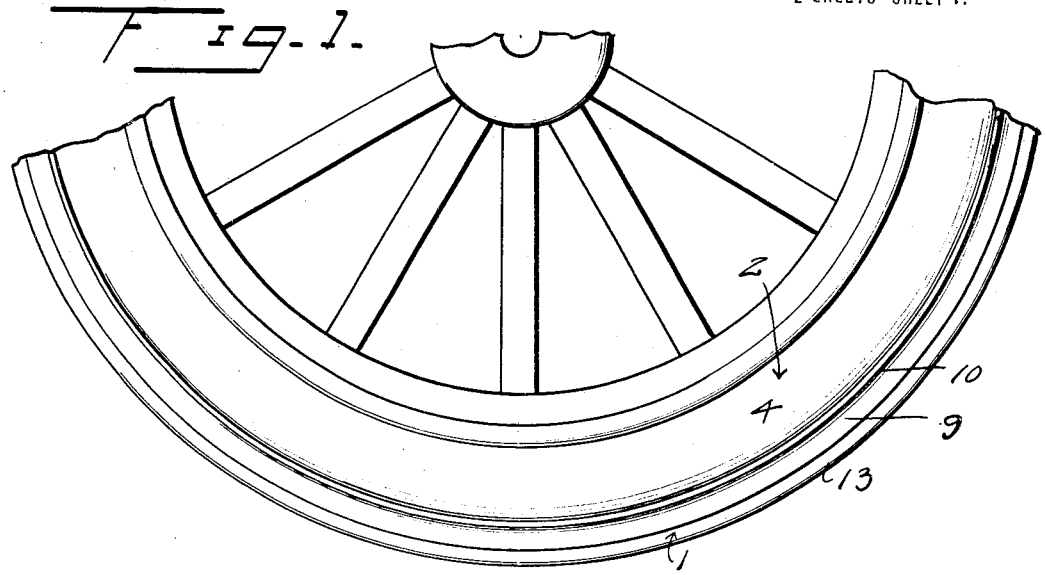
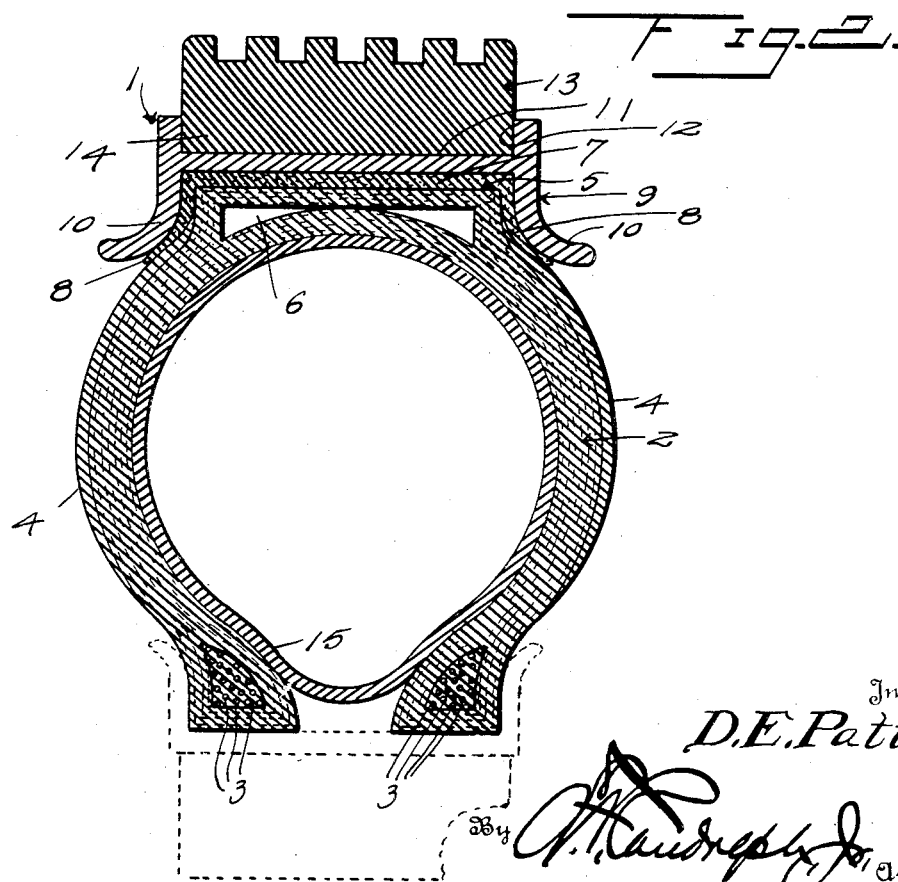
Inventor
D. E. Patton
By [signature], Attorney

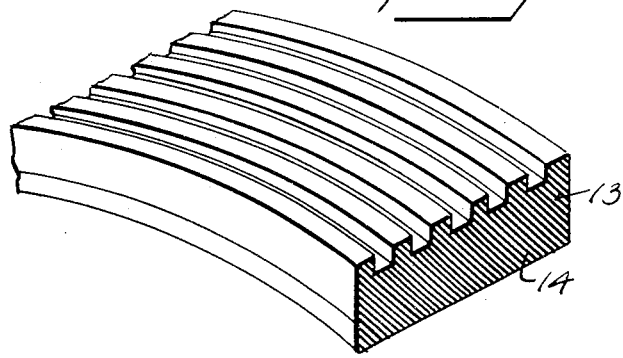
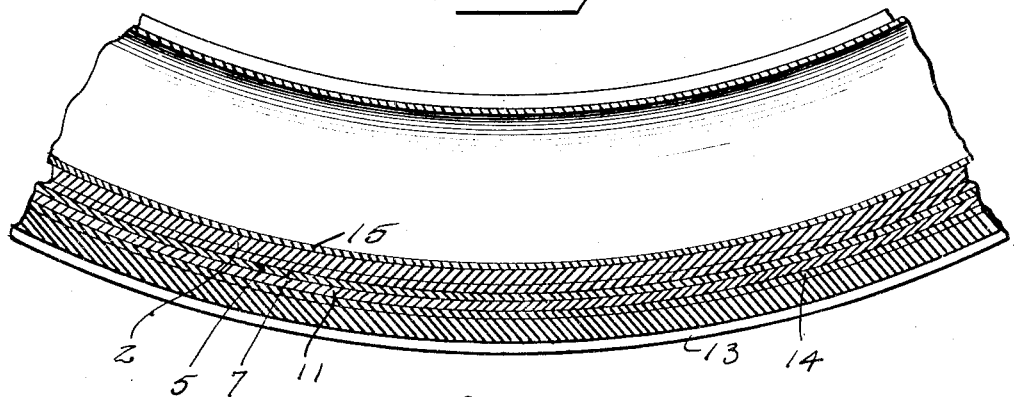
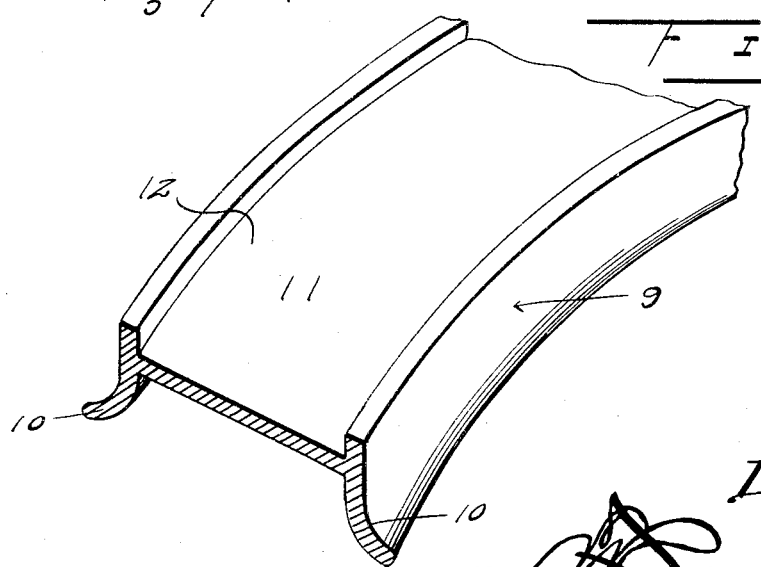

UNITED STATES PATENT OFFICE.

DARRELL E. PATTON, OF FORT WORTH, TEXAS, ASSIGNOR TO CLAUDE R. PARKER, OF NORTH LITTLE ROCK, ARKANSAS.

PUNCTURE-PROOF TIRE.

1,409,021.  Specification of Letters Patent.  Patented Mar. 7, 1922.

Application filed January 26, 1921. Serial No. 440,068.

*To all whom it may concern:*

Be it known that I, DARRELL E. PATTON, a citizen of the United States, residing at Fort Worth, in the county of Tarrant and State of Texas, have invented certain new and useful Improvements in Puncture-Proof Tires; and I do hereby declare the following to be a full, clear, and exact description of the invention, such as will enable others skilled in the art to which it appertains to make and use the same.

This invention relates to new and useful improvements in pneumatic tires and has for its primary object the provision of means for rendering the same substantially puncture and blow-out proof and also to provide the parts of the tire readily changeable so that when one part becomes worn, the same may be replaced by a new part, thereby obviating the waste and expense caused by discarded tires which are rendered unfit for further use owing to a defect, or worn out part while the other parts still remain useful.

Another object of this invention is the provision of a combined armor and tread securing member mounted on the carcass of the tire and adapted to protect the latter from cuts, bruises and excessive wear, and also to prevent sharp obstacles from penetrating the carcass and puncturing the inner tube.

A further object of this invention is the provision of a combined cushion and insulating member located between the combined armor and tread securing member and the carcass and adapted to absorb the initial shock and to distribute the same evenly about the carcass and also to prevent heating of the carcass caused by friction between the same and the armor member.

A further object of this invention is the provision of means for retaining a cushion tread on the armor member and which permits removal of the tread when worn.

A still further object of this invention is the provision of a tire of the above stated character which will be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention reference is to be had to the following description and accompanying drawings in which:—

Figure 1 is a fragmentary side elevation, illustrating a tire constructed in accordance with my invention, Figure 2 is a transverse sectional view illustrating the same, Figure 3 is a fragmentary longitudinal sectional view illustrating the device, Figure 4 is a fragmentary perspective view illustrating the combined armor and tread supporting member, Figure 5 is a fragmentary perspective view illustrating the tread.

Referring in detail to the drawings, the numeral 1 indicates as an entirety a tire consisting of a carcass 2 which is constructed from layers of fabric impregnated with rubber and adapted to be subjected to an ordinary vulcanizing process so as to cause adherence of the layers of fabric. The carcass 2 has its layers of fabric built about a series of wires or rods 3 to form the ordinary beads for the carcass and which may be of any well known shape to fit the ordinary types of tire rims now employed. The walls of the carcass 2 are covered with a thin layer of rubber 4 to protect the same against dirt and moisture. The crest of the carcass 2 is offset to form a tread portion 5 which has embedded therein rubber 6 adapted to form a cushion for the carcass.

The tread 5 of the carcass 2 is covered and protected by a combined cushion and insulating member 7 which has inwardly directed and tapered flanges 8 adapted to engage the sides of the tread portion 5. The member 7 is preferably constructed from a composition of ground cork, ground asbestos, graphite, sulphur and rubber. The member 7 formed from such ingredients will provide a device containing considerable elasticity and heat resisting powers. The elasticity of the member 7 forms an efficient cushion for the carcass 2 and is adapted to absorb the initial shock to the carcass and evenly distribute the same about the carcass. A combined armor and tread supporting member 9 is mounted on the tread 5 of the carcass 2 with the member 7 interposed between itself and the carcass. The member 9 is constructed from any metal suitable for the purpose and has side flanges 10 projecting radially inward and curving laterally outward adapted to engage the walls of the carcass 2 for the purpose of protecting them from sharp obstacles and also to prevent the walls of the carcass from coming in contact with curbing of a roadway. The flanges 8 of the member 7 are positioned between the flanges 10 and the sides of the tread 5 of the carcass 2 as well as the walls of said carcass, to prevent the armor member 9 from heating the carcass by friction. The member 9 is provided with an annular portion 11 arranged inwardly of the outer edges of the side portions of said member 9 to form a channel 12 and is also adapted to rest upon the member 7. The sides of the member 9 project outwardly from the annular member 11 to form retaining flanges for the purpose of receiving and retaining a tread 13 within the channel 12. The tread 13 has its inner portion 14 constructed of substantially hard rubber so as to remain seated within the channel 12 and consequently retain the tread 13 on the member 9. The outer portion of the tread 13 is constructed of pliable rubber which is frequently employed for the construction of ordinary treads upon tires and may have its outer face smooth or corrugated as the user deems advisable.

The member 9 is bathed or coated with a solution consisting of brass dissolved in muriatic acid and water to cause the member 14 to readily adhere thereto, as well as the member 7.

When the carcass 2 is inflated with the usual inner tube 15, the tread 5 is prevented from moving out of the member 9 or between the flanges 10 by said inflation consequently retaining the member 9 firmly upon the creast of the carcass.

While I have shown and described the preferred embodiment of my invention, it will be understood that minor changes in construction, combination, and arrangement of parts may be made without departing from the spirit and scope of the invention as claimed.

Having thus described my invention what I claim is:—

1. A tire comprising a carcass, a tread portion formed at the crest of said carcass, a cushion embedded in said tread portion, a combined armor and tread supporting member mounted on said tread portion, a combined cushion and insulating member interposed between said tread portion and said member, and a tread carried by said member.

2. A puncture-proof tire comprising a carcass, a hollow offset attaching portion formed on the carcass, a cushion element in said attaching portion, an insulating and cushioning strip overlying the attaching portion and having its side edges engaging the side walls of the carcass, an armor tread fastening member receiving the attaching portion with the insulating and cushioning strip interposed between the same and the attaching portion, said member having the edges of its sides curved outwardly to prevent chafing of the carcass, and a solid tread carried by said member.

In testimony whereof I affix my signature in presence of two witnesses.

DARRELL E. PATTON.

Witnesses:
 ITALINE ALSOP,
 P. E. BROWN.